(12) United States Patent
Tanuma et al.

(10) Patent No.: US 9,829,879 B2
(45) Date of Patent: Nov. 28, 2017

(54) GENERATION METHOD AND GENERATION APPARATUS OF TOOL PATH BASED ON CORRECTIONS USING AVERAGE DISTANCES

(75) Inventors: Masashi Tanuma, Kanagawa (JP); Mitsunari Oda, Kanagawa (JP); Takashi Komori, Kanagawa (JP); Takahiro Yoshimura, Kanagawa (JP)

(73) Assignee: Makino Milling Machine, Co., Ltd., Tokyo (JP)

( * ) Notice: Subject to any disclaimer, the term of this patent is extended or adjusted under 35 U.S.C. 154(b) by 696 days.

(21) Appl. No.: 13/881,001

(22) PCT Filed: Oct. 26, 2010

(86) PCT No.: PCT/JP2010/069389
§ 371 (c)(1),
(2), (4) Date: Apr. 23, 2013

(87) PCT Pub. No.: WO2012/056588
PCT Pub. Date: May 3, 2012

(65) Prior Publication Data
US 2013/0211578 A1 Aug. 15, 2013

(51) Int. Cl.
*G05B 19/402* (2006.01)
*G05B 19/4093* (2006.01)

(52) U.S. Cl.
CPC ....... *G05B 19/402* (2013.01); *G05B 19/4093* (2013.01); *G05B 2219/36171* (2013.01);
(Continued)

(58) Field of Classification Search
None
See application file for complete search history.

(56) References Cited

U.S. PATENT DOCUMENTS 4,704,687 A 11/1987 Kishi et al.
5,289,383 A * 2/1994 Sawamura ............. G05B 19/41
318/570
(Continued)

FOREIGN PATENT DOCUMENTS

CN 101403908 4/2009
EP 0439305 A3 6/1992
(Continued)

OTHER PUBLICATIONS

Suk-Hwan S. et al "Incorporation of Tool Deflection in Tool Path Computation: Simulation and Analysis" Journal of Manufacturing Systems, Society of Manufacturing Engineers. Dearborn MI, USA vol. 15 No. 3, Jan. 1, 1996, pp. 190-199 and 193-195.
(Continued)

*Primary Examiner* — Ziaul Karim
*Assistant Examiner* — Saad M Kabir
(74) *Attorney, Agent, or Firm* — Paul & Paul (57) ABSTRACT

A tool path is generated with procedures that include: one of the processing points (Pi) on a multiple rows of tool paths (PA) obtained by connecting multiple prescribed processing points sequentially with straight lines is set as a revision processing point (Pt), points on the multiple rows of tool paths are set as distance calculation points (Pu), and the distance (L) from the revision processing point (Pt) to each of the distance calculation points (Pu) is calculated; the distance calculation points (Pu') for which the distance (L) is within a prescribed value (ΔL) are extracted; the mean values of the position data for the distance calculation points (Pu') and the position data for the revision processing point (Pt) are calculated; and the position data is revised by means of the mean values, and a new tool path (PA') is created.

6 Claims, 7 Drawing Sheets

GENERATION OF NEW TOOL PATH (52) U.S. Cl.
CPC .............. *G05B 2219/36215* (2013.01); *G05B 2219/36227* (2013.01); *G05B 2219/36229* (2013.01); *Y02P 90/265* (2015.11)

(56) References Cited

U.S. PATENT DOCUMENTS

| | | | | |
|---|---|---|---|---|
| 5,815,400 | A | * | 9/1998 | Hirai .................... G05B 19/401 700/173 |
| 2008/0215174 | A1 | * | 9/2008 | Kanai ..................... G06F 17/50 700/98 |

FOREIGN PATENT DOCUMENTS

| | | |
|---|---|---|
| EP | 1225494 A2 | 7/2002 |
| JP | 07-136903 A | 5/1995 |
| JP | 2000-353006 A | 12/2000 |
| JP | 2003-330512 A | 11/2003 |
| JP | 2008-009637 A | 1/2008 |

OTHER PUBLICATIONS

Zhang L P et al "Tool Path Regeneration for Mold Design Modification" Computer Aided Design, Elsevier Publishers BV., Barking GB Department of Mechanical Engineering, National University of Singapore vol. 35 No. 9 Aug. 1, 20013 pp. 813-823.

\* cited by examiner

Tool Path Before Correction

GENERATION OF NEW TOOL PATH

Fig.5B

GENERATION OF NEW TOOL PATH

Fig.6A

PRECISION MODE OF TOOL PATH GENERATION

Fig.6B

PRECISON MODE OF TOOL PATH GENERATION

Fig.7

PRECISION MODE OF TOOL PATH
GENERATION - MODIFICATION

Fig.8

$$\frac{a}{L2^n} + \frac{a}{L3^n} + \frac{a}{1} + \frac{a}{L4^n} + \frac{a}{L5^n} = 1 \quad \cdots(\text{I})$$

WEIGHTED AVERAGE PROCESSING $$a = \frac{1}{\frac{1}{L2^n} + \frac{1}{L3^n} + 1 + \frac{1}{L4^n} + \frac{1}{L5^n}} \quad \cdots(\text{II})$$

$$Q1 = \frac{a}{L2^n} \cdot P2 + \frac{a}{L3^n} \cdot P3 + \frac{a}{1} \cdot P1 + \frac{a}{L4^n} \cdot P4 + \frac{a}{L5^n} \cdot P5 \quad \cdots(\text{III})$$

GENERATION METHOD AND GENERATION APPARATUS OF TOOL PATH BASED ON CORRECTIONS USING AVERAGE DISTANCES

TECHNICAL FIELD

The present invention relates to a generation method and a generation apparatus of a tool path at the time of machining a workpiece.

BACKGROUND ART

In general, when using a numerical control machine tool to machine a workpiece, the machining program is set with a plurality of tool paths using data of machining command points including coordinate components (machining point data). At this time, if there are differences in machine point data in the normal direction of the machined surface between adjoining tool paths, the machined surface will be formed with step differences and the machined shape of the workpiece will be degraded. In order to suppress such step differences between tool paths, an apparatus which inserts auxiliary points between consecutive machining command points (machining points) of one tool path (below, called the "first tool path") by using the tool paths at the two sides of this tool path (below, called the "second and third tool paths") and which uses an approximation curve of these consecutive machining points and auxiliary points to generate a tool path is known (for example, see Patent Literature 1).

The apparatus described in this Patent Literature 1 determines center points of consecutive machining points on the first tool path, draws vertical lines from the center points to the second and third tool path, and determines machining points corresponding to the consecutive machining points on the first tool path, on the second and third tool paths. It uses the machining points on these tool paths to calculate approximation curves of the tool paths, and derives auxiliary points based on these approximation curves and the positions of the legs of the vertical lines drawn from the center points of the first tool path.

However, when, like in the apparatus which is described in the above Patent Literature 1, calculating approximation curves of a plurality of the tool paths to derive auxiliary points, the processing is troublesome and it takes time to generate a tool path.

CITATIONS LIST

Patent Literature 1

Japanese Unexamined Patent Publication No. 2000-353006

SUMMARY OF THE INVENTION

According to an aspect of the present invention provides a generation method of a tool path for generating a tool path at a time of machining a workpiece, includes a distance calculation step of calculating distances from a correction machining point to respective distance calculation points, the correction machining point being one machining point on a plurality of tool paths obtained by successively connecting predetermined pluralities of machining points by line segments, the distance calculation points being points on the plurality of tool paths located around the correction machining point; an extraction step of extracting distance calculation points with distances calculated by the distance calculation step within a predetermined value; an average value calculation step of calculating an average value of position data of the distance calculation points extracted by the extraction step and position data of the correction machining point; and a data correction step of correcting the position data of the correction machining point, by the average value calculated by the average value calculation step, and generating a new tool path base on the corrected position data of the machining point.

Further, according to another aspect of the present invention, an generation apparatus of a tool path for generating a tool path at a time of machining a workpiece, includes a distance calculating unit calculating distances from a correction machining point to respective distance calculation points, the correction machining point being one machining point on a plurality of tool paths obtained by successively connecting predetermined pluralities of machining points by line segments, the distance calculation points being points on the plurality of tool paths located around the correction machining point; an extracting unit extracting distance calculation points with distances calculated by the distance calculating unit within a predetermined value; an average value calculating unit calculating an average value of position data of the distance calculation points extracted by the extracting unit and position data of the correction machining point; and a data correction unit correcting the position data of the correction machining point, by the average value calculated by the average value calculating unit, and generating a new tool path based on the corrected position data of the machining point.

DESCRIPTION OF EMBODIMENTS

Figure 1:
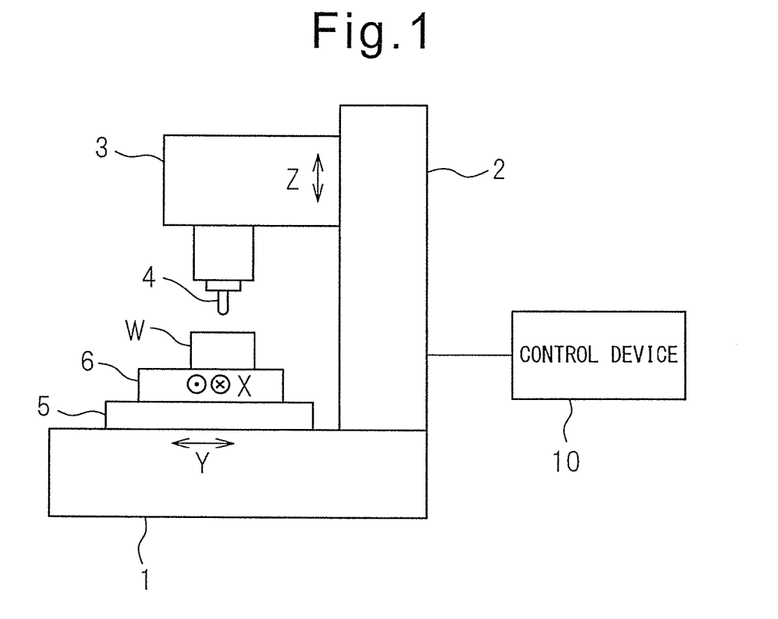
FIG. 1 is a view which shows a general configuration of an entire machine tool which has a tool path generation apparatus according to an embodiment of the present invention.

Below, referring to FIG. 1 to FIG. 8, embodiments of a tool path generation apparatus according to present invention will be explained. FIG. 1 is a view which shows a general configuration of an entire machine tool which has the tool path generation apparatus according to an embodiment of the present invention, and shows a vertical machining center as an example.

A column 2 is erected on a bed 1. At the column 2, a spindle head 3 is supported through a linear feed mechanism movably in the up-down direction (Z-axis direction). At the spindle head 3, a tool 4 is attached facing downward via the spindle. The tool 4 is, for example, an end mill and is driven by a spindle motor inside of the spindle head 3 to rotate. On the bed 1, a saddle 5 is supported through a linear feed mechanism movably in the horizontal direction (Y-axis direction). On the saddle 5, a table 6 is supported to be able to move in the horizontal direction (X-axis direction) perpendicular to the Y-axis direction. Each of the linear feed mechanisms is, for example, comprised of a ball screw and a servo motor which drives the ball screw to rotate. Due to the above configuration, the tool 4 and the workpiece W are made to move relative to each other in the three perpendicular axis directions (X-, Y-, and Z-directions) whereby the workpiece W is machined.

The spindle motor and the servo motors are controlled in accordance with a machining program by a control device 10. The machining program is set with a path of movement of the tool 4 as the tool path in advance. The tool 4 moves relative to the workpiece 4 along this tool path.

The machining program is prepared by utilizing a known CAD/CAM system. That is, the CAD data corresponding to the machined shape of the workpiece W is used as the basis to prepare CAM data consisting of a set of fine linear commands. This CAM data is comprised of a tremendous volume of point group data. Therefore, in order that an amount of data is appreciate in accordance with the machining program, data is thinned from the CAD data in accordance with predetermined rules to prepare a machining program which includes a plurality of machining command points (hereinafter sometimes simply referred to as "machining points" or "block end points").

Figure 2:
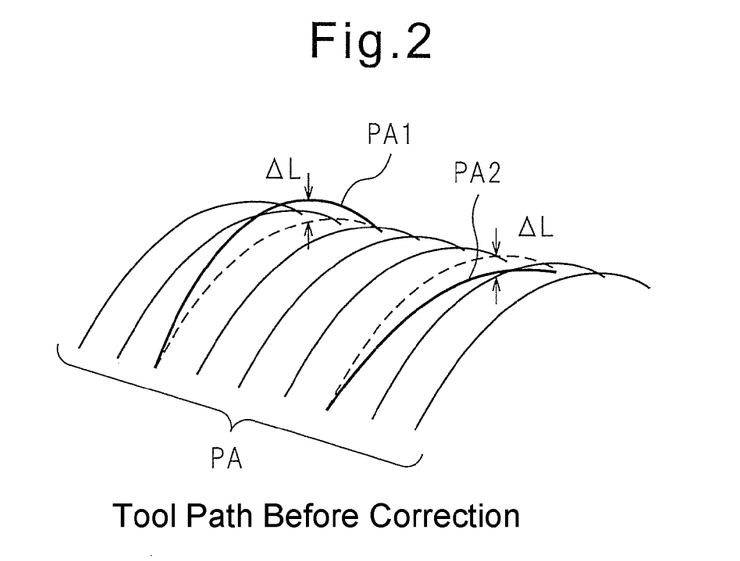
FIG. 2 is a view which shows an example of a tool path before the tool path generation of FIG. 1 is applied.

In such a machining program, coordinate data of the machining points (below, sometimes referred to as "position data", "machining point data", or "block end point data") is given in a block format. If the total number of the machining points from a machining start point to a machining end point is "N", machining point numbers of 1 to N are assigned to the machining points. By successively connecting the machining points P (block end points) in the order of these numbers, a tool path composed of command values of the tool path at the time of machining the workpiece is obtained. Below, the machining point numbers 1 to N are used to express the machining points by P1, P2, . . . , PN. FIG. 2 is a view which shows an example of the tool paths obtained by the thus prepared machining program. A plurality of tool paths PA running along a 3D curved machined surface are shown.

When generating a plurality of tool paths through CAD data and CAM data in this way, shape error at the time of defining the machine shape on the CAD (modeling), approximation error at the time of transferring shape data from the CAD to CAM, etc. cause differences in positions of machining points between tool paths. That is, as shown in FIG. 2 by the tool paths PA1 and PA2, when compared with other tool paths, positional offset ΔL (path error) occurs in the normal direction to the machined surface. As a result, the machined surface suffers from step differences or surface asperity, and a smooth shape of the machined surface cannot be obtained. Therefore, in the present embodiment, in order to enable a smoothed machine surface shape to be obtained even when there are differences in the machining point positions between tool paths, a new tool path in which machining point positions are corrected, is generated in the following way.

Figure 3:
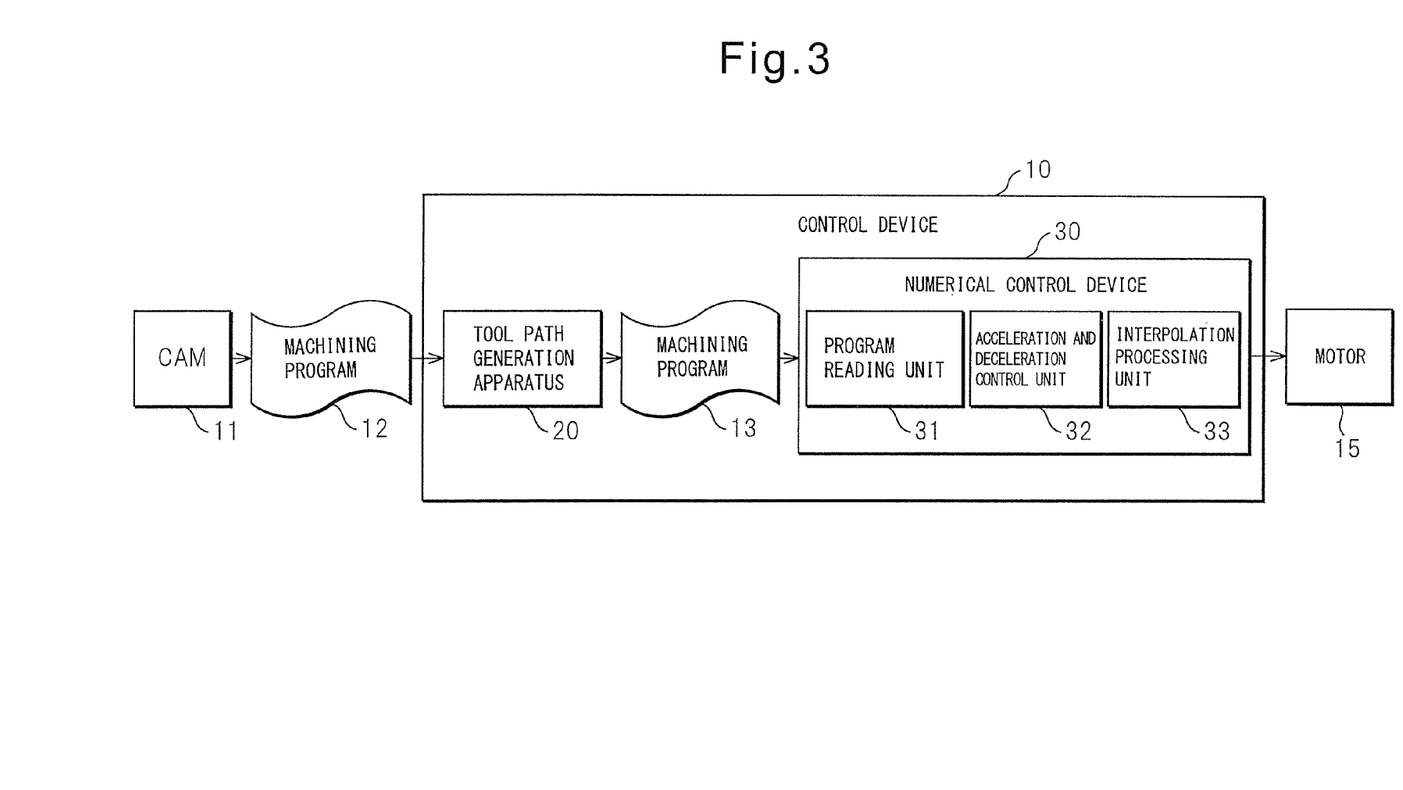
FIG. 3 is a block diagram which shows a configuration of a control device of FIG. 1.

FIG. 3 is a block diagram which shows the configuration of the control device 10. The control device 10 has a tool path generation apparatus 20 which reads the machining program 12 generated by the CAM 11 to generate a new tool path at the time of machining a workpiece and a numerical control device 30 which controls the motor 15 for driving feed axis provided at the machine tool, in accordance with the machining program 13 including a tool path generated by the tool path generation apparatus 20, and moves the tool 4 along the tool path relative to the workpiece. The numerical control device 30 includes a program reading unit 31 which reads NC data set at the machining program 13, an acceleration and deceleration control unit 32 which controls acceleration and deceleration of the motor 15, and an interpolation processing unit 33 which calculates the target movement amounts of the X-direction, Y-direction, and Z-direction feed axes.

Figure 4:
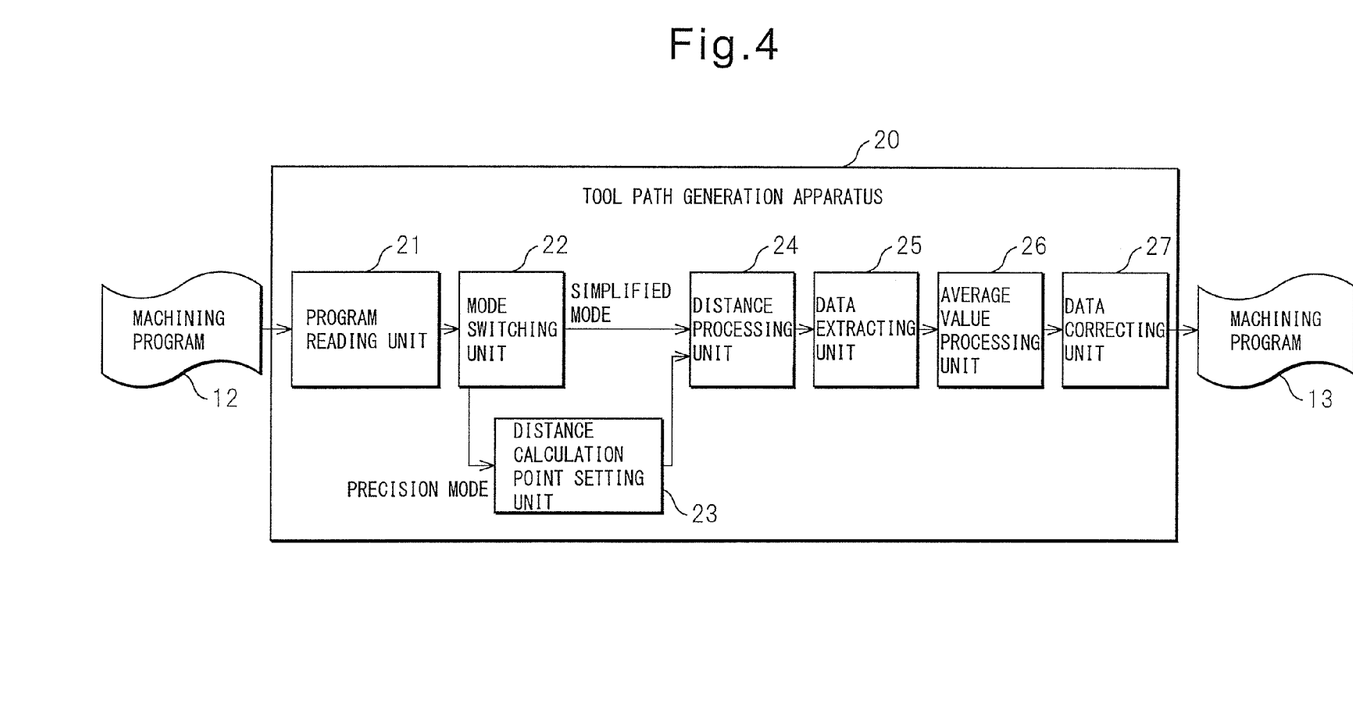
FIG. 4 is a block diagram which shows a configuration of a tool path generation apparatus of FIG. 3.

FIG. 4 is a block diagram which shows the configuration of the tool path generation apparatus 20. The tool path generation apparatus 20 is configured including a processing system which has a CPU, ROM, RAM, and other peripheral circuits etc. and has a program reading unit 21, mode switching unit 22, distance calculation point setting unit 23, distance processing unit 24, data extracting unit 25, average value processing unit 26, and data correction unit 27.

Figure 5A:
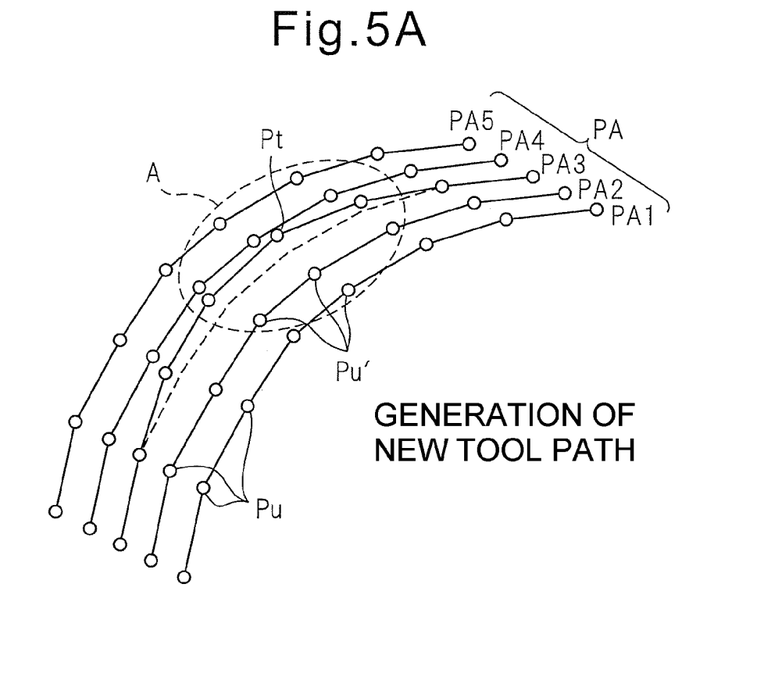
FIG. 5A is a view for explaining generation of a new tool path by application of the tool path generation apparatus in the present invention.

The program reading unit 21 successively reads block end point data of a machining program which is prepared by the CAD/CAM system, that is, 3D coordinate data of the machining points (machining point data). FIG. 5A is a view which shows the tool paths (PA1 to PA5) which are obtained by successively connecting the machining points read at the program reading unit 21 by line segments. In the present embodiment, as explained later, one machining point P is set as the correction machining point Pt, and the distances to points on the tool paths within a predetermined range from the correction machining point Pt are calculated. Here, as shown in FIG. 5A, for example, paths PA1 to PA5 which are five paths adjacent centered about the correction machining point Pt are set as the predetermined range. For this reason, the program reading unit 21 reads and stores in the memory machining point data of a number ΔN corresponding to tool paths PA1 to PA6 which are five paths adjacent centered about the correction machining point Pt.

The amount of data of one path is determined by the amount of feed of the tool 4 and the machining point pitch (interval between machining points). For example, when the amount of feed of the tool 4 is 100 mm and the machining point pitch is 0.1 mm, machining point data of 1000 points per path and of a total of ΔN=5000 points are read. In this case, when the correction machining point Pt is Pi (i-th machining point data), in the range of 1 to N, the machining point data of P(i+1−ΔN/2) to P(i+ΔN/2) are read. Specifically, for example, when N is 10,000 and Pt is P5000, the machining point data of P2501 to P7500 are read, when Pt is P1000, the machining point data of P1 to P3500 are read, and when Pt is P9000, the machining point data of P6501 to P10000 are read.

The mode switching unit 22 is, for example, configured by a switch which is operated by a user and switches a tool path generation mode to either of a simplified mode and a precision mode. At the time of factory shipment, the tool path generation mode may be switched in advance to either of the modes and switching of the mode by the user may be disabled.

Below, first, processing of the distance processing unit 24, data extracting unit 25, and average value processing unit 26 will be explained assuming the tool path generation mode is switched to the simplified mode.

The distance processing unit 24 uses the machining point data (3D coordinate components) which is read by the program reading unit as the basis to calculate the straight line distances L from the correction machining point Pt to the other machining points Pu on the tool paths PA1 to PA5.

The data extracting unit 25 extracts from the machining points Pu the machining points Pu' with distances L from the correction machining point Pt within a predetermined value L1. The predetermined value L1 is, for example, set to a value of substantially the same extent as the distance between adjoining machining points on the same tool path. Therefore, at the data extracting unit 25, as shown in FIG. 5A, a plurality of machining points Pu' which are included in a spherical region (dotted line region A) of a radius $\Delta L1$ centered about the correction machining point Pt are extracted.

Figure 5B:
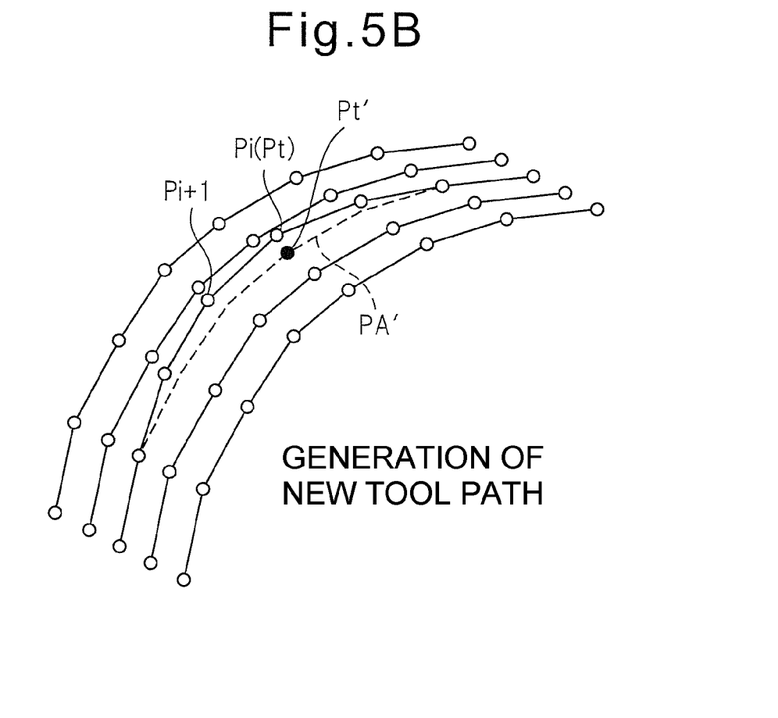
FIG. 5B is a view for explaining generation of a new tool path by application of the tool path generation apparatus in the present invention.

The average value processing unit 26 calculates the average value of the correction machining point Pt and the extracted machining points Pu' for each coordinate component. That is, it adds the X-coordinate value of the correction machining point Pt and the X-coordinate values of respective machining points Pu', and divides the total by the number of added data so as to calculate the average value of the X-coordinate components. It similarly calculates the average values for the Y-coordinate components and the Z-coordinate components. Due to this, as shown in FIG. 5B, it is possible to use the machining point Pi as the correction machining point Pt and obtain the new machining point Pt' which is corrected in position data.

When the processing for calculation of the average values ends, the correction machining point Pt is changed from the machining point Pi to another machining point Pi+1 and the above processing is repeated. That is, the correction machining point Pt is successively changed from the first machining point P1 to the N-th machining point PN and the series of processing repeatedly executed. In this case, even if the processing for calculation of the average values of another machining point Pu (FIG. 5A) has ended, the distance processing unit 24 uses the position data before calculation of the average values to calculate the distances L to the other machining points Pu. That is, when using the machining point Pi+1 of FIG. 5B as the correction machining point Pt to calculate the distances L to the machining points Pi, the values before calculation of the average values are used as the position data of the machining points Pi.

When the processing for calculation of the average values from P1 to PN ends, the data correction unit 27 instructs to rewrite the machining point data of the machining program 12 and thus a new machining program 13 is prepared. That is, the position data of the block end points are rewritten to corrected position data. By successively connecting these corrected block end points, it is possible to generate the new tool path PA' such as shown by the dotted line of FIG. 5B. Rather than after the end of the processing for calculating the average values of all machining points, the machining program may be rewritten each time the processing for calculation of the average value of each machining point Pi ends.

At such a new tool path PA', the position data of the corrected machining point Pt' is averaged by the position data of the machining points Pu' located around the machining point. For this reason, even if the machining point data read from the machining program 12 includes positional offset $\Delta L$ (FIG. 2) in the normal direction with respect to the machined surface, it is possible to reduce that positional offset $\Delta L$ and possible to obtain a shape of a smooth workpiece machined surface.

Figure 6A:
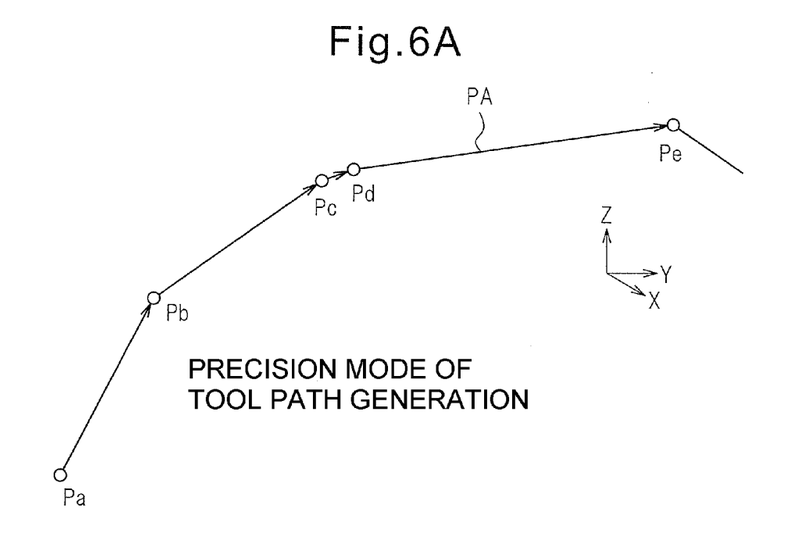
FIG. 6A is a view for explaining a precision mode of the tool path generation apparatus in the present invention.

Next, processing in the case where the mode switching unit 22 is used to switch the tool path generation mode to the precision mode will be explained. FIG. 6A is a view which shows an example of a tool path PA at a machining program 12 read by the program reading unit 21. In the figure, the machining points Pa to Pe are used to show the tool path PA. Pa is the first point which the program reading unit 21 reads.

Figure 6B:
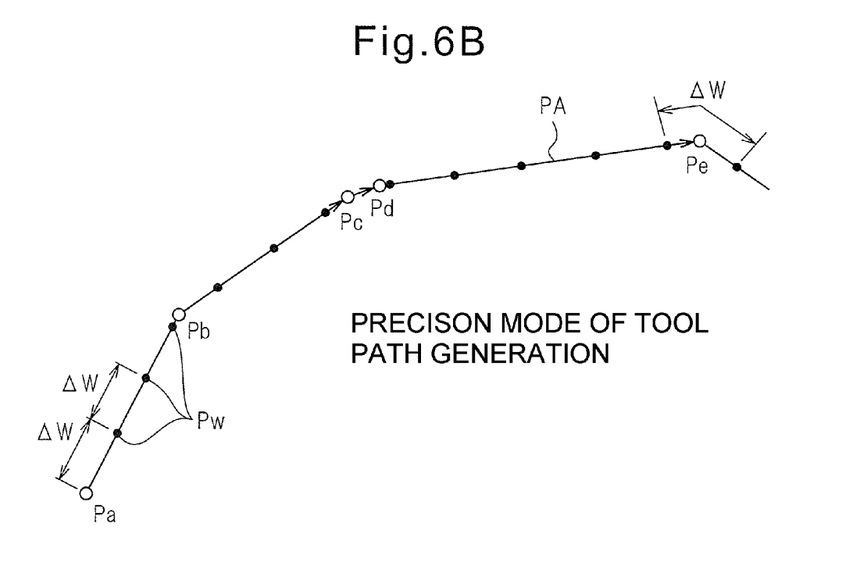
FIG. 6B is a view for explaining a precision mode of the tool path generation apparatus in the present invention.

The distance calculation point setting unit 23 sets on this tool path PA, as shown in FIG. 6B, a plurality of setting points Pw for the individual path segments of a predetermined length $\Delta w$ using Pa as the start point. The setting points Pw are set across the entire tool path P1 to P5 in the predetermined range which is shown in FIG. 5A. The position data of these setting points Pw are stored in the memory. $\Delta w$, considering the storage capacity of the memory, is set to, for example, about ⅓ to ½ of the distance between adjoining machining points on the same path.

The distance processing unit 24 uses the position data of the setting points Pw as the basis to calculate the distances L to each setting point Pw from the correction machining point Pt. The data extracting unit 25 extracts the setting points Pw' with the calculated distances from the correction machining point Pt within the predetermined value L1. The average value processing unit 26 calculates the average values of the correction machining point Pt and the extracted setting points Pw' for each coordinate component. Due to this, it is possible to obtain a new machining point Pt' corrected in position data from the correction machining point Pt.

When the processing for calculation of the average values ends, as shown in FIG. 5B, the correction machining point Pt is changed from the machining point Pi to another machining point Pi+1, and the above processing is repeated. In this case, in the same way as the simplified mode, even if the processing for calculation of the average values of another machining point has already ended, the distance processing unit 24 uses the position data before calculation of the average values to calculate the distances L to the other machining points. When the processing for calculation of the average values ends for all of the machining points P1 to PN, the data correction unit 27 instructs to rewrite the machining point data of the machining program 12 whereby a machining program 13 including the new tool path is prepared.

In processing for correction of the machining point data in such a precision mode, the setting points Pw are set denser than the machining point intervals on the tool path PA. Therefore, a larger number of points than in the simplified mode can be used to carry out processing for averaging the coordinate components. For this reason, the correction machining point Pt is easily influenced by the shape of the surroundings and a smoother workpiece machined surface can be formed.

A typical operation of the tool path generation method according to the present embodiment can be summarized as follows.

First, the program reading unit 21 reads the machining program 12 which is generated by a CAD/CAM system, and stores data of a predetermined number $\Delta N$ of block end points centered about the correction machining point Pt in the memory. When the mode switching unit 22 sets the simplified mode, the distance processing unit 24, as shown in FIG. 5A, calculates the distances L from the correction machining point Pt to the other machining points Pu around it (distance calculation step).

Next, the data extracting unit 25 extracts the machining points Pu' with calculated distances L within a predetermined value ΔL (extraction step), while the average value processing unit 26 calculates the average value of the position data of the extracted machining points Pu' and the position data of the correction machining point Pt (average value calculation step). The above processing is repeated by successively changing the correction machining point Pt to the machining points P1 to PN, then the data correction unit 27 instructs to correct the position data of the machining points P1 to PN so as to generate the new tool path PA' (data correction step).

On the other hand, when the precision mode is set at the mode switching unit 22, the distance calculation point setting unit 23 sets the setting points Pw on the tool path PA by a predetermined path segment interval Δw, while the distance processing unit 24 calculates the distances L from the correction machining point Pt to each setting point Pw. Next, the data extracting unit 25 extracts the setting points Pw' with calculated distances L within a predetermined value ΔL, while the average value processing unit 26 calculates the average values of the position data of the extracted setting points Pw' and the position data of the correction machining point Pt. The correction machining point Pt is successively changed from the machining points P1 to PN to repeat the processing, then the data correction unit 27 instructs to correct the position data of the machining points P1 to PN, so as to generate the new tool path PA'.

According to the present embodiment, the following functions and effects can be exhibited.

(1) In the simplified mode, one machine point Pi on a predetermined plurality of tool paths PA is used as a correction machining point Pt, distances L from the correction machining point Pt to the other machining points Pu are calculated, machining points Pu' with calculated distances L within a predetermined value ΔL are extracted, the average value of the position data of the extracted machining points Pu' and the position data of the correction machining point Pt is calculated, and by this average value, the position data of the correction machining point Pt is corrected (Pt') to generate a new tool path PA'. Due to this, even if the machining point data set in the machining program 12 differs, no step difference is formed at the machined surface and a smooth workpiece machined shape can be obtained. Further, a simplified calculation formula can be used to correct the correction machining point Pt to Pt', and thus it is possible to shorten the processing time required for correction of the machining point and possible to quickly generate the new tool path PA'.

(2) In the precision mode, setting points Pw are set on a plurality of tool paths PA at denser intervals than the machining point intervals, the distances L from the correction machining point Pt to the different setting points Pw are calculated, the setting points Pw' with calculated distances L within a predetermined value ΔL are extracted, the average value of the position data of the extracted setting points Pw' and the position data of the correction machining point Pt is calculated, and by this average value, the position data of the correction machining point Pt is corrected to generate a new tool path PA'. Due to this, compared with the simplified mode, it is possible to obtain a smoother workpiece machined shape.

(3) The mode switching unit 22 can switch the tool path generation mode between the simplified mode which can generate the tool path faster and the precision mode which can generate the tool path smoother. Therefore, it is possible to easily respond to the various needs of the users.

(4) The distance processing unit 24 uses the machine point data before positional correction so as to calculate the distances L from the correction machining point Pt. Therefore, it is possible to obtain a certain tool path PA' regardless of the order of setting the correction machining point Pt.

Figure 7:
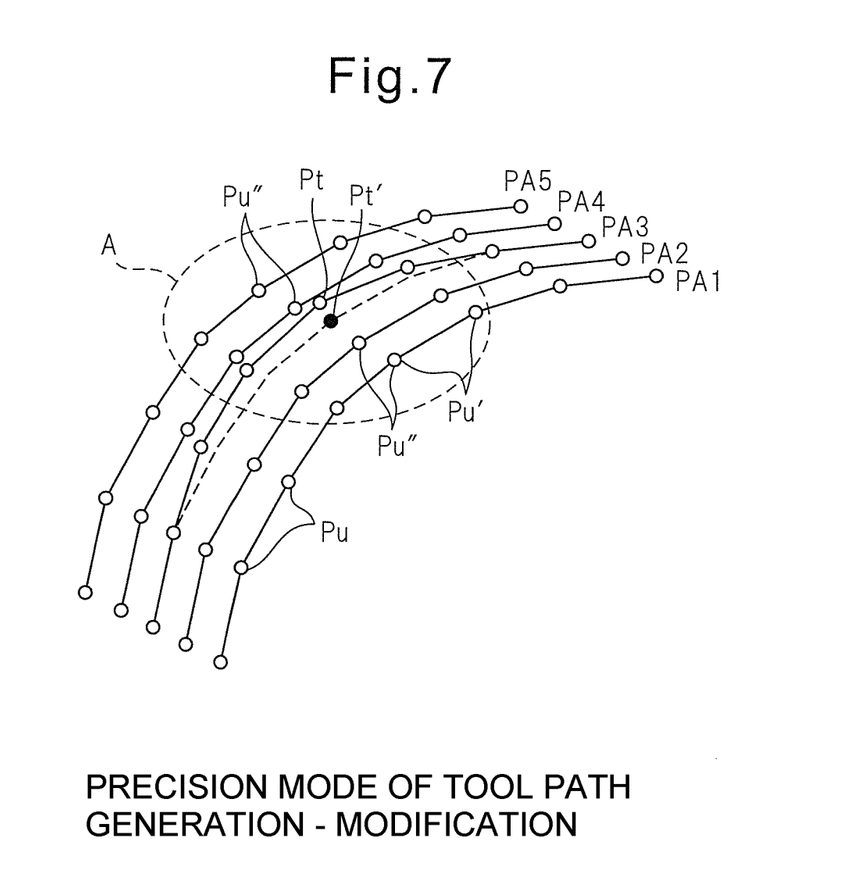
FIG. 7 is a view which shows a modification of FIG. 5A and FIG. 5B.

In the above embodiment (simplified mode), although the data extracting unit 25 extracts the machining points Pu' with a distance L from the correction machining point Pt within a predetermined value ΔL, an extracting unit is not limited to this configuration. For example, as shown in FIG. 7, when there are a plurality of machining points PU' with distances L within a predetermined value AL on the tool paths PA1, PA2, PA4, and PA5 not including the tool path PA3 which has the correction machining point Pt (dotted line region A), it is also possible to extract only the single machining point Pu'' closest to the correction machining point Pt for each of the tool paths PA1, PA2, PA4, and PA5 and to determine the average value of these Pu'' and Pt. In this case, the machining points Pi with consecutive machining point numbers may be assumed to be on the same paths and the machining points Pi with the shortest distances L may be extracted from the machining points Pi with consecutive machining point numbers. In the precision mode as well, when extracting a plurality of the setting points Pw' on respective tool paths, it is also possible to extract only the setting points Pw'' closest to the correction machining point Pt from among them.

Figure 8:
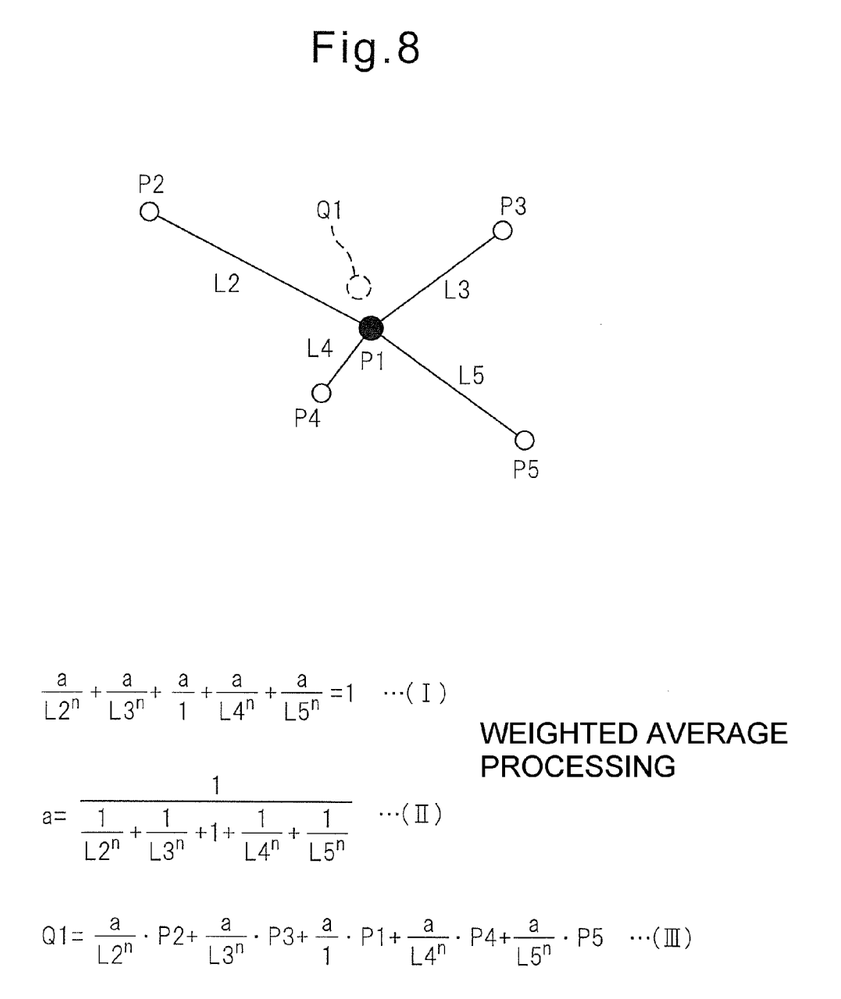
FIG. 8 is a view for explaining a weighted average processing in an average value processing unit of FIG. 3.

In the above embodiment (simplified mode), the data extracting unit 25 obtains simple averages of the extracted machining points Pu' and the correction machining point Pt. However, an average value calculating unit is not limited to this configuration. For example, it may also obtain a weighted average. FIG. 8 is a view for explaining an example of the method of calculation of the weighted average. In the figure, the correction machining point Pt is represented by P1, respective machining points Pu' extracted by the data extracting unit 25 are represented by P2 to P4, and the lengths from the correction machining point P1 to the machining points P2 to P5 are represented by L2 to L5. At this time, by making "n" any natural number, calculating "a" by formulas (I) and (II) of the figure, and entering it into formula (III), it is possible to calculate the coordinates of the average value Q1.

In this way, by using the weighted averages to correct the position data of the correction machining point Pt, the effect on the average value becomes larger the closer a point to the correction machining point Pt (in FIG. 8, P4). For this reason, when the distances L between the correction machining point P1 and the machining points P2 to P5 greatly differ, although, with simple averages, the distance between the original point P1 and the averaged point Q1 easily increases and the tool path easily becomes wavy, with weighted averages, the occurrence of waviness can be suppressed. Note that, "n" is a coefficient which shows the degree of weighting. The larger the "n", the more difficult it becomes for the original point P1 to move. In FIG. 8, the Pu' are four points, it is possible to similarly calculate the average value even if the Pu' are three points or less or five points or more. In the precision mode as well, it is similarly possible to calculate the weighted average value of the correction machining point Pt and the setting points Pw'.

In the above embodiment, although the distance processing unit 24 calculates the distances from the correction machining point Pt to the other machining points Pu or the distances L to setting points Pw set at equal intervals on the tool paths, it is also possible to set a point other than machining points Pu or the setting points Pw as a distance calculation point and a distance calculating unit is not limited to the above-mentioned configuration.

As long as using the average value calculated by the average value processing unit 26 to correct the position data of the correction machining point Pt and generating the new tool path PA' based on the position data of the corrected machining point Pt', the data correction unit 27 may be configured in any way. For example, it is also possible to use the position data of the corrected machining point Pt' to calculate an approximation curve and newly set a machining point along the approximation curve so as to generate a new tool path PA'.

Although all machining points P1 to PN are successively replaced with the correction machining point Pt to carry out processing for calculating the average values so as to generate the new tool path PA', it is also possible to replace part of the machining points (for example, just one point) with the correction machining point Pt to carry out processing for calculating the average values so as to generate the new tool path PA'.

In the above embodiment, the control device 10 provided at the machine tool is provided with the tool path generation apparatus 20 and the numerical control device 30, and the tool path generation apparatus 20 instruct to rewrite the machining program 12 to the machining program 13. However, it is also possible to constitute so that the tool path generation apparatus 20 outputs a machining command which an acceleration and deceleration control unit of the numerical control device 30 can interpret. The tool path generation apparatus 20 may be provided inside the numerical control device 30 or inside of the CAM 11. It is also possible to provide a computer separate from the control device 10 with the tool path generation apparatus 20. In the above embodiment, although the tool path generation apparatus 20 is applied to a machining center, the tool path generation apparatus of the present invention may be similarly applied to other machine tools where it is necessary to generate a tool path at the time of machining a workpiece.

According to the present invention, the distances from a machining point to distance calculation points on a plurality of tool paths are calculated and the average value is used to generate a new tool path. Therefore, it is possible to quickly generate a new tool path by a simplified calculation formula without calculating an approximation curve, etc.

REFERENCE SIGNS LIST

10 control device
20 tool path generation apparatus
21 program reading unit
22 mode switching unit
23 distance calculation point setting unit
24 distance processing unit
25 data extracting unit
26 average value processing unit
27 data correction unit
30 numerical control device
Pt, Pt' correction machining point
PA, PA' tool path

The invention claimed is:

1. A method of machining a workpiece with a machine tool to provide a smoothed machined surface, including controlling the machine tool by generating a tool path by a control device for the machine tool at a time of machining the workpiece, comprising:
    providing a machine tool;
    providing a workpiece;
    generating a tool path for the machine tool including the steps of:
    a reading step of reading, by a program reading unit of the control device, a plurality of tool paths which are obtained by successively connecting a plurality of machining points with line segments in accordance with a predetermined rule based on shape data for machining the workpiece;
    a distance calculation step of calculating, by a distance processing unit of the control device, distances from a correction machining point to respective distance calculation points by determining one of the machining points as a correction machining point on the plurality of tool paths, which have been generated in the machining program generation step, by line segments; extracting tool paths, which are located within a predetermined range from the correction machining point, from the plurality of tool paths; and determining the distance calculation points on the extracted tool paths which are located within the predetermined range;
    an extraction step of extracting, by a data extracting unit of the control device, distance calculation points with distances calculated by the distance calculation step within a predetermined value;
    an average value calculation step of calculating, by an average value processing unit of the control device, an average value of position data of the distance calculation points extracted by the extraction step and position data of the correction machining point; and
    a data correction step of correcting, by a data correction unit of the control device, the position data of the correction machining point, by the average value calculated by the average value calculation step, and generating a plurality of new tool paths based on the corrected position data of the machining point; and
    machining the workpiece by moving the machine tool relative to the workpiece according to a new tool path,
    further including, successively changing the correction machining point from the one machining point to other machining points and repeating the distance calculation step, the extraction step, and the average value calculation step, for each correction machining point which is changed to calculate an average value of position data of each correction machining point, wherein the data correction step includes correcting the position data of each the correction machining point, by the average value of the position data of each the correction machining point, and generating a new tool path based on corrected position data of the machining points.

2. The method according to claim 1, wherein the distance calculation points are other machining points other than the one machining point on the plurality of tool paths, and the distance calculation step includes calculating distances from the correction machining point to the other machining points.

3. The method according to claim 1, wherein the distance calculation points are a plurality of setting points set on the plurality of tool paths at equal intervals, and the distance calculation step includes calculating distances from the correction machining point to the plurality of the setting points.

4. The method according to claim 1, wherein the average value calculation step includes calculating the average value by obtaining a weighted average of the position data of the distance calculation points extracted by the extraction step for the position data of the correction machining point.

5. The method according to claim 1, wherein the extraction step further including extracting, for each tool path other than a tool path having the correction machining point, machining points with the distances calculated by the distance calculation step within the predetermined value and closest to the correction machining point as the distance calculation points.

6. A generation apparatus of a tool path for generating a tool path, by a control device of a machine tool, at a time of machining a workpiece, comprising:

a program reading unit configured to read a plurality of tool paths which are obtained by successively connecting a plurality of machining points with line segments in accordance with a predetermined rule based on shape data for machining the workpiece;

a distance calculating unit calculating distances from a correction machining point to respective distance calculation points by determining one of the machining points as a correction machining point on a plurality of tool paths which have been generated by the machining program generating unit, by line segments; extracting tool paths, which are located within a predetermined range from the correction machining point, from the plurality of tool paths; and determining the length calculation points on the extracted tool paths which are located within the predetermined range;

an extracting unit extracting distance calculation points with distances calculated by the distance calculating unit within a predetermined value;

an average value calculating unit calculating an average value of position data of the distance calculation points extracted by the extracting unit and position data of the correction machining point; and a data correction unit correcting the position data of the correction machining point, by the average value calculated by the average value calculating unit, and generating a plurality of new tool paths based on the corrected position data of the machining point, the control device being configured to machine the workpiece by moving the machine tool relative to the workpiece according to a new tool path, and the control device being configured to successively change the correction machining point from the one machining point to other machining points and repeat the distance calculation step, the extraction step, and the average value calculation step, for each correction machining point which is changed to calculate an average value of position data of each the correction machining point, wherein the data correction unit is configured to correct the position data of each the correction machining point, by the average value of the position data of each the correction machining point, and generate a new tool path based on corrected position data of the machining points.

* * * * *